United States Patent
Al-Nakhli et al.

(10) Patent No.: US 11,945,996 B2
(45) Date of Patent: Apr. 2, 2024

(54) IN-SITU FOAM GENERATION FOR WATER SHUTOFF

(71) Applicant: Saudi Arabian Oil Company, Dhahran (SA)

(72) Inventors: Ayman Raja Al-Nakhli, Dammam (SA); Wajdi Mohammed Buhaezah, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/569,226

(22) Filed: Jan. 5, 2022

(65) Prior Publication Data
US 2023/0212450 A1 Jul. 6, 2023

(51) Int. Cl.
| | |
|---|---|
| C09K 8/512 | (2006.01) |
| C09K 8/504 | (2006.01) |
| C09K 8/518 | (2006.01) |
| C09K 23/00 | (2022.01) |
| C09K 23/34 | (2022.01) |

(52) U.S. Cl.
CPC ............ *C09K 8/518* (2013.01); *C09K 8/5045* (2013.01); *C09K 8/512* (2013.01); *C09K 23/002* (2022.01); *C09K 23/017* (2022.01); *C09K 23/34* (2022.01)

(58) Field of Classification Search
CPC ...... C09K 8/518; C09K 8/5045; C09K 8/512; C09K 23/002; C09K 23/017; C09K 23/34
See application file for complete search history.

(56) References Cited

U.S. PATENT DOCUMENTS

| | | | |
|---|---|---|---|
| 4,846,277 | A | 7/1989 | Khalil et al. |
| 6,516,885 | B1 | 2/2003 | Munday |
| 10,718,184 | B1 * | 7/2020 | Alharith .................. C09K 8/528 |
| 11,111,753 | B2 | 9/2021 | Almohsin et al. |
| 2008/0105428 | A1 | 5/2008 | Santra et al. |
| 2015/0114649 | A1 * | 4/2015 | Osorio ...................... C09K 8/44 |
| | | | 166/305.1 |
| 2020/0408063 | A1 * | 12/2020 | Almohsin ............. E21B 33/138 |

FOREIGN PATENT DOCUMENTS

| | | |
|---|---|---|
| CN | 101493006 | 7/2009 |
| CN | 101638979 | 2/2010 |
| CN | 102329599 | 1/2012 |
| CN | 106589225 | 4/2017 |
| WO | WO 2013078306 | 5/2013 |
| WO | WO 2015161205 | 10/2015 |

OTHER PUBLICATIONS

Al-Nakhlin et al., "A Breakthrough Water Shut off System for Super-K Zones in Carbonate Ghawwar Field: Adsorption and Polymer System," SPE-179790, presented at the SPE EOR Conference at Oil and Gas West Asia, Muscat, Oman, Mar. 2016, 22 pages.

* cited by examiner

*Primary Examiner* — Kumar R Bhushan
(74) *Attorney, Agent, or Firm* — Fish & Richardson P.C.

(57) ABSTRACT

A system and method for water shutoff, including providing a treatment fluid including a polymer and a nitrogen-generating compound through a wellbore into a water zone in a subterranean formation, generating nitrogen gas in the water zone by a reaction of the nitrogen-generating compound, generating foam from the nitrogen gas and the treatment fluid in the water zone to give foamed polymer in the water zone, and sealing the water zone with the foamed polymer.

17 Claims, 4 Drawing Sheets

IN-SITU FOAM GENERATION FOR WATER SHUTOFF

TECHNICAL FIELD

This disclosure relates to water shutoff in a subterranean formation.

BACKGROUND

A wellbore in a subterranean formation in the Earth crust may be treated. The wellbore treatments may facilitate production of hydrocarbon, such as crude oil or natural gas, or both, from the subterranean formation. A problematic section of a wellbore to be treated may be a water zone in which water enters the wellbore from the hydrocarbon formation or underlying water aquifer. The influx of water into the wellbore during production of crude oil and/or natural gas can add cost. The production of water along with the hydrocarbon from the hydrocarbon formation can lead to surface processing of the water and injection of the water back into the hydrocarbon formation for disposal or pressure maintenance. Such processing and injection of water produced from the wellbore water zone causes increased costs of the oil and/or gas production.

SUMMARY

An aspect relates to a method of water shutoff, including providing a treatment fluid having a polymer and a nitrogen-generating compound through a wellbore into a water zone in a subterranean formation, and generating nitrogen gas in the water zone by a reaction of the nitrogen-generating compound, wherein the reaction is activated by a temperature of the subterranean formation or by an acid, or both. The method includes generating foam from the nitrogen gas and the treatment fluid in the water zone to give foamed polymer in the water zone, and sealing the water zone with the foamed polymer.

Another aspect relates to a method of water shutoff, including providing a treatment fluid having a polymer, a crosslinker, and a nitrogen-generating compound through a wellbore into a water zone in a subterranean formation, generating nitrogen gas in-situ in the water zone by a reaction of the nitrogen-generating compound, wherein the reaction is activated by a temperature of the subterranean formation or by an acid, or both, and generating foam in-situ from the nitrogen gas and the treatment fluid in the water zone to give foamed treatment fluid in the water zone, wherein the foamed treatment fluid gives the foamed polymer. The method includes sealing the water zone with the foamed treatment fluid, wherein the polymer of the foamed polymer undergoes crosslinking via the crosslinker, and wherein the foamed polymer becomes a solid foam polymer that restricts water flow from the subterranean formation into the wellbore at the water zone.

Yet another aspect relates to a method of water shutoff, including injecting a treatment fluid having a polymer, crosslinker, and a nitrite-containing compound through a wellbore into a water zone in a subterranean formation, reacting the nitrite-containing compound in the water zone to give nitrogen gas in the water zone, generating foam in the water zone via the nitrogen gas giving the polymer as foamed polymer in the water zone, and sealing the water zone with the foamed polymer, wherein sealing the water zone involves the foamed polymer restricting water flow from the water zone into the wellbore.

Yet another aspect is a method of water shutoff, including pumping a treatment fluid having a polymer, a crosslinker, and a nitrogen-generating compound through a wellbore into a water zone in a subterranean formation. The method includes forming nitrogen gas via activation of a reaction of the nitrogen-generating compound in the water zone, thereby foaming the treatment fluid in the water zone to give foamed treatment fluid having the polymer, wherein the activation is by heat or by acid, or both, wherein the heat is from the subterranean formation, and wherein nitrogen gas is not added to the treatment fluid at Earth surface. The method includes crosslinking the polymer via the crosslinker to give crosslinked polymer, wherein the foamed treatment fluid includes the crosslinked polymer, and wherein the crosslinked polymer as foamed restricts water flow from the water zone into the wellbore.

The details of one or more implementations are set forth in the accompanying drawings and the description below. Other features and advantages will be apparent from the description and drawings, and from the claims.

DETAILED DESCRIPTION

Figure 1:
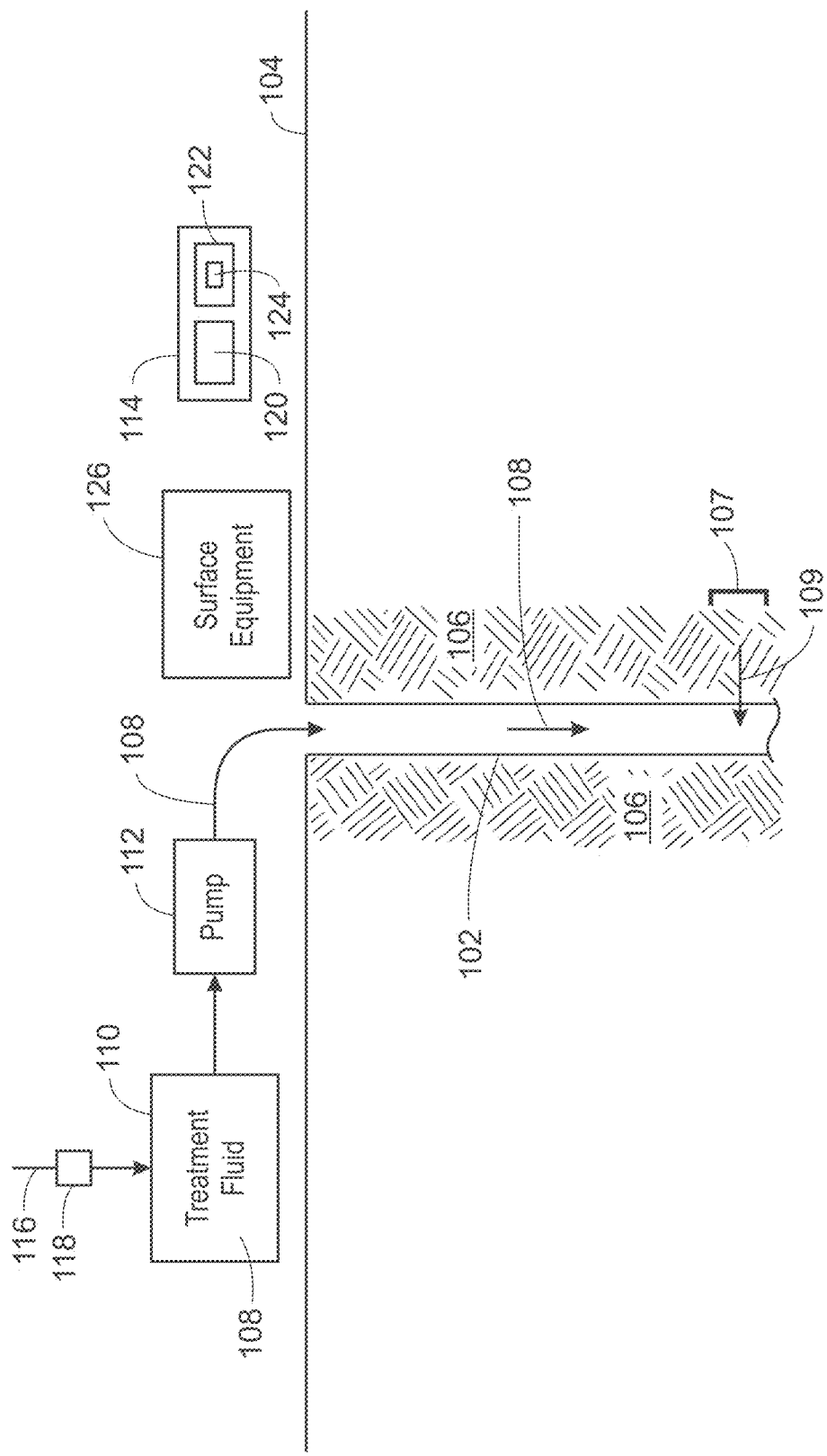
FIG. 1 is a diagram of a well site having a wellbore formed through the Earth surface into a subterranean formation in the Earth crust.

Aspects of the present disclosure are directed to water shutoff treatment to control excess water production, such as in carbonate and sandstone formations. Excessive water production from hydrocarbon-producing wells can adversely affect the economic life of the well. An estimated average 2.8 barrels of water is produced for each barrel of oil worldwide.

Some aspects of the present disclosure relate to a water shutoff system (composition) that employs (includes) thermochemical reagents. The thermochemical reagents may be incorporated into the treatment fluid at surface, and the treatment fluid pumped into the well. The treatment fluid may be an aqueous solution including polymer. The treatment fluid may generally be a liquid at surface and as introduced into the well. The reaction of the thermochemical reagents may be activated downhole by reservoir temperature or by a chemical activator. The reaction of the thermochemical reagents generates nitrogen gas that may foam the treatment fluid in-situ. Consequently, the treatment fluid as foamed may beneficially expand to cover larger areas and volumes of the water zone than if the treatment fluid were not foamed. Thus, the present foaming of the treatment fluid via in-situ generation of nitrogen gas can be more cost effective than if the treatment fluid were not foamed. The in-situ foaming of the aqueous treatment fluid having polymer may beneficially result in utilizing less volume of fluid for the water-shutoff treatment than if the treatment fluid were not foamed. The in-situ generated foam may seal the water-bearing zone. Advantageously, in implementations, the sealing may not only be by chemical bonding to the rock, but also provide for mechanically isolating the water-bearing zone in a sense that the polymer hardens or solidifies as foamed and thus provides an enlarged volume of resistance to water flow.

The in-situ foam may be polymer foam that hardens (solidifies) and adheres to the formation rock to provide for the water shut-off. Beneficially, the application may selectively seal water zones, leaving oil zones undamaged or substantially undamaged. Therefore, in embodiments, the treatment fluid can be bullheaded without need for mechanical diversion. Foam may typically be generated in the water-bearing zone. The system will generally not function in oil zones (little or no foam in oil zones), as oil is a known foam killer.

The hardened polymer is oil soluble. Therefore, if removal from the water zone is subsequently desired, diesel or other low-density oil can be injected to break and dissolve the hardened foam polymer.

Embodiments of the present techniques are directed to water shutoff to stop excess water production by pumping into the wellbore a treatment composition (prepared at surface) having polymer and thermochemical reagents. The thermochemical reagents may be, for example, ammonium chloride (e.g., $NH_4Cl$) and sodium nitrite (e.g., $NaNO_2$). The reaction of the reagents is activated downhole via reservoir temperature (and/or by an added activator) to generate nitrogen gas in-situ to give in-situ generated foam (foamed polymer) to seal the water-bearing zone.

Advantageously, because the liquid column of the treatment composition as being pumped in the wellbore generally has little or no foam, the hydrostatic pressure is greater than if the treatment composition were foamed at surface. Such maintaining of the liquid hydrostatic pressure can help (facilitate) to squeeze the foam at the water zone. Further, again, the treatment beneficially may selectively seal water zones (leaving oil zones generally undamaged) because oil (crude oil) may act as a defoamer.

Moreover, the treatment fluid may include an adsorption system (e.g., including amino-saline) to further promote bonding of the foamed polymer downhole to the formation rock at the water zone. The treatment fluid may include an adsorption system that further advances bonding of the foamed polymer to subterranean formation rock in the water zone. Some examples are the adsorption system including silane compounds or a combination of silane compounds and silicates.

The term "adsorption system" as used herein refers to a composition utilized to promote (advance) the adhering (bonding) of the hardened (solid) foamed polymer to formation rock in the water zone. As would be appreciated by one of ordinary skill in the art, the term "system" here in this context of adsorption system is the composition (to give behavior/interactions) and not, for example, a system of equipment (e.g., vessels, pumps, piping, etc.). The adsorption system (adsorption composition) may be included (incorporated in) the treatment fluid (treatment fluid composition).

Reservoir heterogeneity may be a reason for both low oil recovery and early excess water production. Gel treatments have been utilized in field applications to both improve oil recovery and suppress water production. Gel treatments at injection wells to plug preferentially water thief zones may be a proven cost-effective technique to improve sweep efficiency in reservoirs. In addition, gel treatments reduce excess water production during hydrocarbon production.

Nitrogen-generating compounds, such as sodium nitrite and ammonium chloride, may be incorporated with the water-control fluid system having polymer. The fluid system may be pumped into the wellbore in which production suffers of high water cut. Foaming agents and foam stabilizers may be included the fluid system. Upon injecting the fluid into the formation, the nitrogen-generating compounds (or the reaction of the nitrogen-generating compounds) may be activated by downhole temperature or by a chemical activator. When these reactants are activated, nitrogen gas may be generated in-situ, and foamed polymer may be created to seal the water-bearing zone. However, when the fluid enters an oil zone, foam will generally not be created because oil can act as a defoamer and reduce or prevent foam generation. The fluid system may be effective because foam can typically cover relatively large areas and seal fractures (and channels) in the high-water bearing zones.

The generation of foam downhole instead of at surface can be a practical way to squeeze foam into the formation, including from an operational point of view. Hydrostatic pressure of the liquid column may generally provide extra pressure to the pump hydraulic forces, which may help to squeeze the fluid as foamed downhole. In implementations for this system, because foam is not generated (e.g., nitrogen gas is not added) at surface, special gas pumps for preparing foam at surface may be avoided (not required). Liquid pumps for pumping the non-foamed fluid may be adequate. Conversely, when foam is generated on surface, as in traditional foamed fluid preparation, hydrostatic pressure will generally be low and pumping issues may be encountered to apply the treatment fluid in reservoirs.

Moreover, the aforementioned adsorption system (such as an amino-saline system) may be employed to bond the polymer downhole to formation rock, which may enhance the stability of the solid foam and promote sealing (shutting off) water production.

Embodiments herein include an in-situ foamed water-shutoff system. The treatment fluid for the water shutoff may include nitrogen-generating compounds, polymer, guar, surfactants, foaming agents, polymers stabilizers, cross linkers, clay stabilizers, an adsorption system, corrosion inhibitors, scavengers, etc. The treatment fluid may be a self-energizing treatment fluid in a sense that treatment fluid includes a component (nitrogen-generating compound) that when activated (e.g., triggered by formation heat) generates nitrogen gas in-situ to energize and foam the treatment fluid. The nitrogen-generating compounds may be, for example, sodium nitrite and/or ammonium chloride. One or more of nitrogen-generating compounds may be employed in the treatment fluid and when activated result in the treatment fluid as foamed polymer. Nanomaterial, such as silicon dioxide, e.g., silica nanoparticles having a diameter less than 100 nanometers (nm), can be used to improve foam stability. In embodiments, the treatment fluid can withstand reservoir temperatures up to 350° F.

The treatment fluid can be pumped as bullheaded or using coiled tubing. The nitrogen-generating compound may be activated by formation temperature. A post flush with acidic fluid can also be pumped from surface to further activate the treatment fluid downhole. The in-situ foamed polymer fluid may reduce water production and may be more cost effective compared to foaming the treatment fluid at the Earth surface. This in-situ foam-generated treatment for water shutoff may be applied, for example, to carbonate formations, sandstone formations, shale formations, and tight formations.

This treatment fluid can be utilized for water control by selectively isolating water-bearing zones of the subterranean formation adjacent the wellbore. In implementations, the present treatment fluid does not foam (or does not significantly foam) in oil-bearing zones, where reservoir oil reduces or prevents the formation of foam. Moreover, diesel, condensate, and other hydrocarbon fluid (as well as defoamers) can be employed in implementations to remove the cured foamed polymer from the water zone if desired.

The treatment fluid can be utilized for gas control to prevent unwanted gas production. The application of sealing a gas zone via the present technique of in-situ generated gas and foam may be the same or similar as the application of sealing a water zone as discussed throughout the present disclosure. In certain instances, natural gas may be an unwanted produced fluid. In such instances, crude oil (not natural gas) may be the desired hydrocarbon for production. Natural gas as a produced unwanted gas is generally separated and flared before the crude oil is distributed. In some operations, gas-handling capabilities are not readily available at the well site.

Lastly, the activating or activation (e.g., by heat and/or acid) of a nitrogen-generating compound(s) may mean activating or activation (e.g., by heat and/or acid) of a reaction of the nitrogen-generating compound(s). Activation of a nitrogen-generating compound(s) may mean to trigger a reaction of the nitrogen-generating compound(s). For example, activation of nitrogen-generating compound(s) in the treatment fluid may mean to trigger or activate a reaction of a nitrite-containing compound (e.g., sodium nitrite) to generate nitrogen gas. In another example, activation of nitrogen-generating compound(s) in the treatment fluid may mean to trigger or activate a thermochemical reaction between an ammonium-containing compound (e.g., sodium chloride) and a nitrite-containing compound (e.g., sodium nitrite) to generate nitrogen gas.

FIG. 1 is a well site 100 having a wellbore 102 formed through the Earth surface 104 into a subterranean formation 106 in the Earth crust. There is a water zone 107 in which water 109 enters the wellbore 102 from the subterranean formation 106. The water zone may be the region (e.g., near wellbore region) near or adjacent the wellbore 102 and that is the source of the water 109. The portion of the wellbore 102 at that depth and/or that receives the water 109 may be called a water zone.

The subterranean formation 106 may be labeled as a geological formation, a rock formation having hydrocarbon, a hydrocarbon formation, a formation reservoir, a hydrocarbon reservoir, a natural gas reservoir, a reservoir, and the like. The wellbore 102 can be vertical, horizontal, or deviated. The wellbore 102 can be openhole but is generally a cased wellbore. The annulus between the casing and the formation 106 may be cemented. Perforations may be formed through the casing and cement into the formation 106. The perforations may allow both for flow of treatment fluid into the subterranean formation 106 and for flow of produced hydrocarbon (and water such as water 107) from the subterranean formation 106 into the wellbore 102.

The well site 100 may have a delivery system for providing a treatment fluid 108 through the wellbore 102 into the subterranean formation 106. In implementations, the treatment fluid 108 is for water shutoff. In certain examples, the treatment fluid 108 may be characterized as a water-shutoff chemical composition. The delivery system may be labeled as a treatment-fluid delivery system. The treatment fluid 108 may generally be a liquid at surface and as introduced into the wellbore 102.

In the illustrated embodiment, the delivery system includes a source 110 of treatment fluid 108 at the Earth surface 104 near or adjacent the wellbore 102. The source 110 may include one or more vessels holding the treatment fluid 108. The treatment fluid 108 may be stored in vessels or containers on ground, on a vehicle (for example, truck or trailer), or skid-mounted.

The treatment fluid 108 may be a water-based treatment fluid. In some implementations, the treatment fluid 108 is an aqueous solution of polymer in which water is the primary component of the treatment fluid 108. The treatment fluid 108 can be gel-based fluids. The treatment fluid 108 includes a polymer (e.g., PAM-co-AA), a crosslinker (e.g., polyethyleneimine) for crosslinking the polymer, and at least one nitrogen-generating compound. The term PAM-co-AA refers to a copolymer of acrylamide monomer units and acrylic acid monomer units. The treatment fluid 108 can include polymers and surfactants generally. The treatment fluid 108 may include surfactant(s), foaming agent (including a foamer and/or a foam stabilizer), formaldehyde, silicate (e.g., sodium silicate), silane (e.g., 3-aminopropyltriethoxysilane), and so forth. Again, in the illustrated embodiment, the treatment fluid 108 includes at least one nitrogen-generating compound, such as a nitrite-containing compound and/or an ammonium-containing compound. In operation, the treatment fluid 108 is provided to (introduce into) the wellbore 102. The treatment fluid 108 may be injected (pumped) into the wellbore 102.

The delivery system for the treatment fluid 108 at the well site 100 may include motive devices, such as one or more pumps 112, to provide (e.g., inject, pump) the treatment fluid 108 through the wellbore 102 into the subterranean formation 106. The pump(s) 112 may be, for example, positive displacement pumps and arranged in series or parallel. Again, the wellbore 102 may be a cemented cased wellbore and have perforations for the treatment fluid 108 to flow (e.g., via motive force of the pumps 112) into the formation 106. In some implementations, the speed of the pumps 112 may be controlled to give desired flow rate of the treatment fluid 108. The system may include a control component to modulate or maintain the flow of treatment fluid 108 into the wellbore 102 for the water-shutoff treatment. The control component may be, for example, a control valve(s). In some implementations, as indicated, the control component may be the pump(s) 112 as a metering pump in which speed of the pump 112 is controlled to give the desired or specified flow rate of the treatment fluid 108. The set point of the control component may be manually set or driven by a control system, such as the control system 114.

The treatment fluid 108 may be prepared (formulated and mixed) offsite prior to disposition of the treatment fluid 108 into the source 110 (e.g., vessel(s) at the well site 100. Alternatively, a portion (some components) of the treatment fluid 108 may be mixed offsite and disposed into the source 110 vessel and the remaining portion (remaining components) of the treatment fluid 108 added to the source 110 vessel or to a conduit conveying the treatment fluid 108. In other implementations, the treatment fluid 108 may be prepared onsite with components added to (and batch mixed in) the source 110 vessel.

For embodiments of the treatment fluid 108 including one or more nitrogen-generating compounds, the treatment fluid 108 in the source 110 vessel may have all components of the treatment fluid 108. In other words, the treatment fluid 110 may be disposed as fully prepared at the source 110 (e.g., in a vessel) before treatment is initiated. In certain embodiments, some components of the treatment fluid 108 may be added to the source 110 vessel near or at the time (or during) the pumping of the treatment fluid 108 into the wellbore 102 for the treatment (water shutoff). In some embodiments, not all components of the treatment fluid 108 are included in the source 110 vessel. Instead, at least one component of the treatment fluid 108 may be added to the conduit conveying the treatment fluid 108 either to a suction conduit of the pump 112 or a discharge conduit of the pump 112, or both, as the treatment fluid 108 is being pumped into the wellbore 102. Such can be characterized as on-the-fly addition of the component.

An additive or component 116 (or composition including multiple components) may be added to the treatment fluid 108. The component(s) 116 may be, for example, the nitrogen-generating compound(s) or the adsorption system. The concentration of the component(s) 116 (for example, nitrogen-generating compound or nitrogen-generating compounds, or the adsorption system) in the treatment fluid 108 may be maintained or altered (adjusted) by adjusting (modulating) a flow rate (mass or volume) of addition of the component(s) 116 via a control device 118. The set point of the control device 118 may be manually set or specified (directed) by the control system 114. The control device 118 may be a control valve on the conduit conveying component 116 to the source 110 (for example, vessel) of the treatment fluid 108. For the component 116 as a nitrogen-generating compound(s), the addition rate of the component 116 may be adjusted to alter the amount or concentration (e.g., weight percent, volume percent, gpt, etc.) of the component 116 in the treatment fluid in response to operational feedback from the water-shutoff treatment operation. For instance, the addition rate of the nitrogen-generating compound may be altered in response to measured wellbore pressure as indicated to the control system 114. The addition rate of the nitrogen-generating compound may be reduced to decrease wellbore pressure. The wellbore pressure may be indicated, for example, by a pressure sensor in the wellbore or at the wellhead. In implementations, the addition rate of the nitrogen-generating compound may be increased to increase the wellbore pressure or the amount foaming in the hydraulic fractures.

For the component 116 as a nitrogen-generating compound(s), the nitrogen-generating compound may be added as a liquid. The nitrogen-generating compound may be added as a solid (powder), for example, via the control device 118 as a rotary feeder valve. Alternatively, the nitrogen-generating compound(s) may in added in an aqueous solution or dispersion to the treatment fluid 108 in the source 110 vessel. Moreover, instead of adding the component 116 to the source 110 vessel, the component 116 may be added to the discharge conduit of the pump 112 as the pump 112 is providing the treatment fluid 108 into the wellbore 102.

In implementations, the nitrogen-generating compound(s) and/or the adsorption system are not added as the component(s) 116 but instead are incorporated in the formulation (e.g., initial formulation) prior to pumping the treatment fluid 108 into the wellbore 102.

As mentioned, an adsorption system (e.g., amino-silane system) may be included in the treatment fluid 108 for promoting bonding of the foamed polymer to formation 106 rock. For embodiments including such an adsorption system, the combining of the adsorption system and the remainder (or portions) of the treatment fluid may be delayed until the time of pumping the treatment fluid 108 into the wellbore. For example, the adsorption system and the remaining portion (or some other components) of the treatment fluid are not combined to give the treatment fluid 108 (or most of the treatment fluid 108) until within 4 hours of pumping the treatment fluid 108 through the wellbore 102 into the subterranean formation 106.

The treatment fluid 108 may be a self-energizing treatment fluid in a sense that the treatment fluid 108 includes nitrogen-generating compound(s) activated by formation 106 temperature (and/or by a chemical activator) to generate nitrogen in-situ to energize (and foam) the treatment fluid 108. As discussed, in-situ generation of foam can be more straightforward and practical (less costly) than forming foam at the surface 104 by mixing gas with the treatment fluid 108 at surface. Surface mixing of foam in the treatment fluid 108 prior to introduction to the wellbore 102 is not only generally complex operationally, but also can result in pump 112 failure as may be difficult to squeeze foam into the formation 106 from the surface 104. For surface foam, the pumped squeeze may be a challenge due to low hydrostatic pressure of the foam (as compared to treatment fluid not foamed at surface) flowing downward through the wellbore 102. In contrast, with implementations of the present treatment fluid 108, the treatment fluid 108 as introduced into the wellbore 102 may generally be liquid with little or no foam and thus provide the benefit (for the pump or squeeze) of greater hydrostatic pressure than if the treatment fluid was foamed at surface 104.

As discussed, the treatment fluid 108 includes a nitrogen-generating compound, which may be a nitrite-containing compound or an ammonium-containing compound, or both. The nitrite-containing compound can be, for example, sodium nitrite or potassium nitrite, or both. In implementations, the nitrite-containing compound (without presence of the ammonium-containing compound) generates the nitrogen ($N_2$) gas via decomposition or dissociation of the nitrite-containing compound due to temperature of the subterranean formation and/or due to acid as an activator. This generation of nitrogen gas via sodium nitrite without presence of an ammonium-containing compound was confirmed in the Example below.

The ammonium-containing compound can be, for example, ammonium hydroxide, ammonium chloride, ammonium bromide, ammonium nitrate, ammonium nitrite, ammonium sulfate, ammonium carbonate, or ammonium hydroxide, or any combinations thereof. The ammonium-containing compound can react with the nitrite-containing compound to generate nitrogen gas. The ammonium-containing compound provides ammonium ions and the nitrite-containing compounds provide nitrite ions. In this context for implementations, the ammonium-containing compound and the nitrite-containing compound can be called thermochemical reagents and the reaction labeled as a thermochemical reaction. For the specific implementation of the ammonium-containing compound as ammonium chloride ($NH_4Cl$) and the nitrite-containing compound as sodium nitrite ($NaNO_2$), the reaction can be as follows that generates $N_2$, water ($H_2O$), and sodium chloride (NaCl):

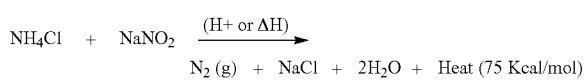

In this thermochemical reaction (an exothermic reaction) depicted immediately above, sodium chloride (NaCl), water ($H_2O$), and heat are generated in addition to the generated $N_2$. The heat generated may be, for example, 75 kilocalories per mol (Kcal/mol). The thermochemical reaction can be activated by heat ($\Delta H$) and/or a hydrogen ion (H+) such as from an acid. While the thermochemical reaction may experience an enthalpy change, the symbol $\Delta H$ here represents the addition of heat, such as at temperatures greater than 120° F., such as in the range of 120° F. to 375° F. The chemical activator may be a compound (e.g., acid) capable of releasing an acidic hydrogen.

Heat provided by the formation 106 may activate this reaction. The ammonium-containing compound (e.g., ammonium chloride) and nitrite-containing compound (e.g., sodium nitrite) may react at formation temperature without an acid activator. In implementations, the pH of the treatment fluid may influence the reaction triggering (activation) temperature. In some examples at pH above 11, the formation temperature (heat) is generally inadequate to activate the reaction. Therefore, an acid activator may be injected. In implementations, acids that can be used as an activator (chemical activator) for the reaction (e.g., a thermochemical reaction) of the nitrite-containing compound with the ammonium-containing compound (e.g., as thermochemical reagents) to generate nitrogen gas include weak acids (e.g., acetic acid, citric acid, etc.) and strong acids (hydrochloric acid, etc.). The strong acids when added to (or otherwise incorporated) into the treatment fluid can be concentrated or diluted. In embodiments, the acid is not included in the treatment fluid, but instead is pumped through the wellbore 102 to the water zone 107 in the formation 106 after pumping the treatment fluid 108.

In general, a compound capable of releasing an acidic hydrogen can be utilized as the chemical activator in implementations. Moreover, reservoir temperature (temperature of the subterranean formation) may be adequate to activate the thermochemical reaction without a chemical activator. Such temperature activation may readily occur in certain implementations, for example, at pH less than 11.

Further, in implementations, the ammonium-containing compound (e.g., ammonium chloride) and the nitrite-containing compound (e.g., sodium nitrite) may generally not react in the treatment fluid at surface 104. Also, in embodiments, little or no extent of this reaction may occur while the treatment fluid is traveling downhole through the wellbore 102 to the fractures. In instances, the temperature of the fluid may be below the triggering temperature of the reaction. The reaction (e.g., thermochemical reaction) activation may be a function of temperature and pH, and can be affected by pressure. The pH of the treatment fluid can be increased, for example, by including and adjusting the amount hydroxide-containing compounds (e.g., sodium hydroxide) in the treatment fluid, to adjust reaction activation temperature in view of the wellbore 102 and reservoir 106 temperature. In certain embodiments, the pH of the treatment fluid may be increased to at least 11 (e.g., in the range of 11 to 13, or 11 to 12.5), so the reaction will generally not take place without a chemical activator. An activator can be injected as a post-flush to reduce the pH and trigger the reaction. When implemented, a post-flush with acidic fluid may include organic acid (e.g. acetic acid, etc.) or inorganic acid (e.g., hydrochloric acid, citric acid, etc.). Lastly, a nitrite-containing compound(s) can be employed as a stand-alone reactant without ammonium ions or acid to generate $N_2$ gas, as discussed.

Example components and their example concentrations are given for the present treatment fluid (e.g., treatment fluid 108). The unit of molar given is molar concentration in moles of the component per liters of the treatment fluid. The concentration of the nitrite-containing compound (e.g., sodium nitrite) in the treatment fluid can be, for example, less than 15 molar, or in the range of 0.5 molar to 10 molar (or 1 molar to 9 molar). The concentration of the ammonium-containing compound (if included) in the treatment fluid can be, for example, less than 12 molar, or in the range of 0.5 molar to 8 molar (or 1 molar to 6 molar).

Moreover, the nitrogen-generating compound(s) is generally not encapsulated. In implementations, the reaction to generate in-situ nitrogen gas may be activated by reservoir temperature (or pressure), or by subsequently pumping an acid (e.g., acetic acid, etc.). Therefore, in implementations, encapsulation (e.g., to delay the reaction) is typically not needed because formation temperature is not excessive or because acid is not included in the treatment fluid. In addition, the treatment fluid may be a relatively viscous treatment fluid. The present treatment fluid may have the nitrogen-generating compound(s) as a thermochemical additive(s). These thermochemical additives may be incorporated within the treatment fluid and activated inside the reservoir (e.g., activated via reservoir temperature). Upon activation, nitrogen gas (and thus foam) may be generated downhole in the reservoir to energize and foam the treatment fluid and thus promote application of the treatment fluid in the reservoir (subterranean formation 106).

In implementations, the treatment fluid is predominantly (primarily) water. In implementations, the treatment fluid 108 may be, for example, at least 90 volume percent (vol %) of water or at least 90 weight percent (wt %) of water. The treatment fluid may include the polymer (e.g., polyacrylamide as a homopolymer, or polyacrylamide as a copolymer having acrylamide monomer units and other monomer units) at a concentration, for example, in the range of 2 vol % (or wt %) to 6 vol % (or wt %). The polymer may be in the range of 2-6 w/v % (weight/volume percentage concentration) of the polymer (e.g., PAM-co-AA) in the water in the treatment fluid or in the treatment fluid. For crosslinking this polymer, the treatment fluid may include a crosslinker at a concentration in the range, for example, of 0.5 gallons per thousand gallons (gpt) to 4 gpt. The crosslinker may be, for example, an organic crosslinker (e.g., polyethyleneimine) or an inorganic crosslinker. The treatment fluid can include an adsorption system (e.g., having silane, or silane and silicate) for bonding the polymer to formation rock. The treatment fluid may include polymer stabilizers, clay stabilizers, corrosion inhibitors, nanomaterial (e.g., silica nanoparticles) to improve foam stability, scavengers (e.g., oxygen scavenger), and so on. The treatment fluid may include a surfactant(s) in a range of 0.1 gpt to 4 gpt to reduce friction of flow of the treatment fluid. Surfactant(s) may also act to promote generation and/or stabilization of foam. The treatment fluid may include a gel stabilizer in a range of 0.1 gpt to 4 gpt. The gel stabilizer can include alkaline metal oxides, alkaline metal hydroxides, alkaline earth metal oxides, alkaline earth metal hydroxides, transition metal oxides, transition metal hydroxides, glycols, or polyols, or any combinations thereof. The gel stabilizer can be an organic gel stabilizer. In function, the gel stabilizer can be a viscosity stabilizer that stabilizes viscosity of the treatment fluid.

The treatment fluid includes a foaming agent(s), for example, in the range of 1 gpt to 60 gpt to promote formation of the foam or to promote stability of the foam, or a combination thereof. A foaming agent is a material (e.g., surfactant) that facilitates the formation (and sometimes stability) of foam. When present (e.g., in relatively small amounts) the foaming agent may reduce surface tension of a liquid (reduces the work needed to create the foam) and/or be a foam stabilizer that may increase the foam colloidal stability by inhibiting coalescence of bubbles. The foaming agent (which may be a foamer or a foam stabilizer) may be a surfactant, such as a betaine (for example, hydroxysulfobetaine) or a hydroxysultaine (for example, cocamidopropyl hydroxysultaine). In certain contexts, distinctions may be made between foaming agent versus foam stabilizer in that a foaming agent (foamer) may be characterized as compounds that facilitate or promote generation of foam and a foam stabilizer may be characterized as compounds that facilitate or promote stability (resist collapsing) of the foam after generation of the foam. In these contexts, foaming agents can be, for example, surfactants and fatty acid, and foam stabilizer can be organic or inorganic compounds, and nanomaterials. However, in other instances, the foaming agent may be characterized as generally synonymous with foam stabilizer. A foaming compound that advances foam may be a foaming agent and/or a foam stabilizer.

In addition to the treatment-fluid delivery system, the well site 100 may include additional surface equipment 126. The surface equipment 126 may support the treatment-fluid delivery system. The surface equipment 126 may provide for general operations at the well site 100. The surface equipment 126 may include a wellhead to support the production of fluid from the subterranean formation 106. A wellhead may be a component or structure at the Earth surface 104 coupled to (or in communication with) the wellbore 102 and that provides the structural and pressure-containing interface for drilling and production equipment. The wellhead generally includes conduits (piping, tubing, etc.) and valves for receiving, routing, and discharge of fluid (e.g., hydrocarbon, water, etc.) produced from the formation 106.

After shutoff of the water zone 107 via application of the treatment fluid 108, the production of hydrocarbon (e.g., crude oil or natural gas, or both) from the subterranean formation 106 through the wellbore 102 to the Earth surface 104 may be performed. The hydrocarbon may discharge from the wellbore 102 through the wellhead, such as through a production valve of the wellhead. In implementations, the hydrocarbon may be routed through the production valve into a sales line. The routing of the hydrocarbon flow from the wellbore 102 may via an automated production valve (and manual valves) on the wellhead.

The well site 100 may include the control system 114 that supports or is a component of the treatment-fluid delivery system. The control system 114 includes a processor 120 and memory 122 storing code 124 (logic, instructions) executed by the processor 120 to perform calculations and direct operations at the well site 900. The processor 120 may be one or more processors and each processor may have one or more cores. The hardware processor(s) 120 may include a microprocessor, a central processing unit (CPU), a graphic processing unit (GPU), a controller card, or other circuitry. The memory may include volatile memory (for example, cache and random access memory (RAM)), nonvolatile memory (for example, hard drive, solid-state drive, and read-only memory (ROM)), and firmware. The control system 114 may include a desktop computer, laptop computer, computer server, programmable logic controller (PLC), distributed computing system (DSC), controllers, actuators, control cards, an instrument or analyzer, and a user interface. In operation, the control system 114 may facilitate processes at the well site 100 and including to direct operation of aspects of the treatment-fluid delivery system.

The control system 114 may be communicatively coupled to a remote computing system that performs calculations and provides direction. The control system 114 may receive user input or remote-computer input that specifies the set points of the control device 118 or other control components in the treatment-fluid delivery system. The control system 114 may specify the set point of the control device 118 for the component 116 addition. In some implementations, the control system 114 may calculate or otherwise determine the set point of the control device 118. The determination may be based at least in part on the operating conditions of the water shutoff operation and on information (or feedback) regarding wellbore pressure or amount of downhole foaming.

Figure 2:
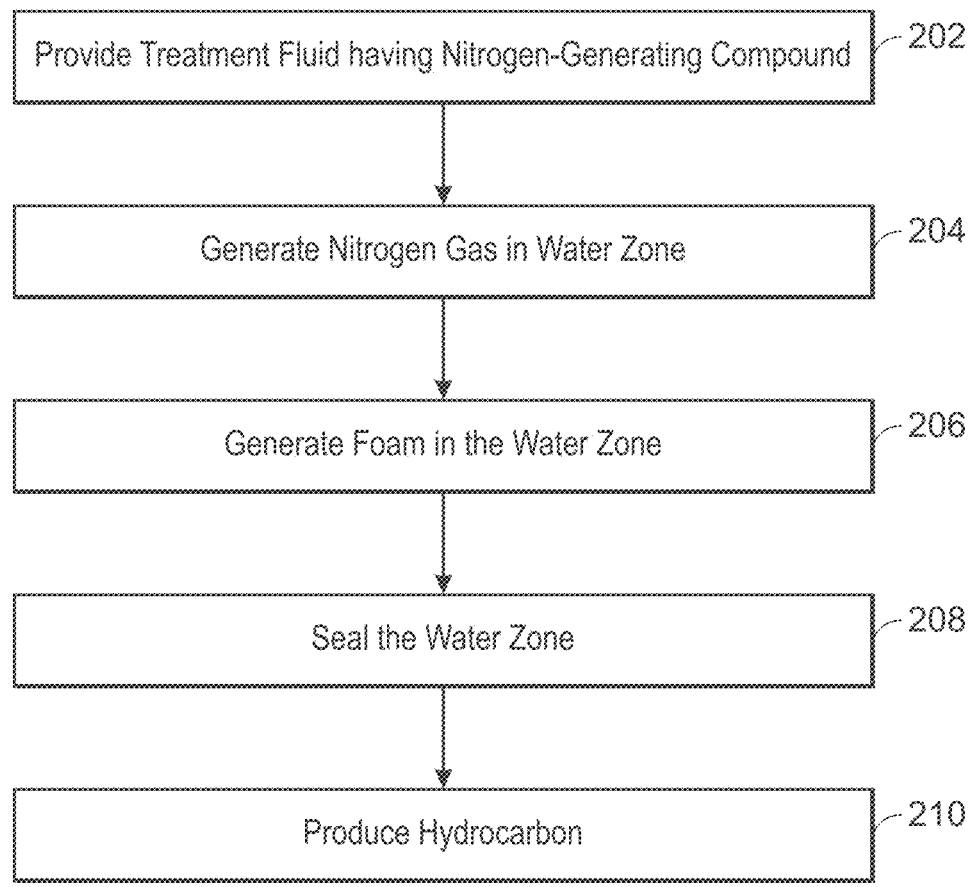
FIG. 2 is a block flow diagram of a method of water shutoff.

FIG. 2 is a method 200 of water shutoff, such as at a region of a subterranean formation. The water shutoff may restrict or stop water flow from the region (a water zone) of the subterranean formation into a wellbore. The water zone may include a region of the subterranean formation near or adjacent the wellbore. The water zone be at least in the near wellbore region. The operations for the water shutoff may be performed at a well site having the wellbore formed through the Earth surface in the subterranean formation in the Earth crust. The well site may provide for hydrocarbon production from the subterranean formation.

At block 202, the method includes providing (e.g., introducing, injecting, pumping, etc.) a treatment fluid having a polymer and a nitrogen-generating compound through a wellbore into the water zone in the subterranean formation. The treatment fluid may be a water-based (aqueous) treatment fluid. The nitrogen-generating compound may be, for example, at least one of [1] a nitrite-containing compound (e.g., sodium nitrite or potassium nitrite, or both) or [2] an ammonium-containing compound. In implementations, the nitrogen-generating compound includes the nitrite-containing compound. In implementations, the nitrogen-generating compound(s) is (are) not encapsulated.

The polymer may be polyacrylamide homopolymer or a polyacrylamide copolymer, or both. The polyacrylamide copolymer may be a copolymer of acrylamide monomer units and acrylic acid monomer units or a copolymer of acrylamide monomer units and acrylate monomer units, or both. The polymer may include polyacrylamide including at least one of polyacrylamide homopolymer (PAM), PAM-co-AA that is a copolymer of acrylamide (monomer units) and acrylic acid (monomer units), or a copolymer of acrylamide (acrylamide monomer units) and an acrylate (acrylate monomer units), and so forth. The treatment fluid may include a crosslinker, such as polyethyleneimine or other crosslinker, for crosslinking the polymer. The well site may have a delivery system (e.g., including a vessel, pump, etc.) at the Earth surface near or adjacent the wellbore for providing the treatment fluid through the wellbore into the water zone.

In implementations, foam is not added to, nor generated in, the treatment fluid at Earth surface. In implementations, nitrogen gas is not added to the treatment fluid (e.g., at Earth surface) prior to introduction of the treatment fluid into the wellbore, foam is not added to the treatment fluid (e.g., at Earth surface) prior to the introduction of the treatment fluid into the wellbore, and foam is not generated in the treatment fluid (e.g., at Earth surface) prior to the introduction of the treatment fluid into the wellbore.

At block 204, the method includes generating (forming) nitrogen gas (in-situ) in the water zone by a reaction (e.g., thermochemical reaction) of the nitrogen-generating compound(s), wherein the reaction is activated (triggered) by a temperature (heat) of the subterranean formation or by an acid, or both. The acid may include weak acids (e.g., acetic acid, citric acid, etc.) and/or strong acids (hydrochloric acid, etc.). In general, a compound capable of releasing an acidic hydrogen can be utilized as the chemical activator (acid activator) in implementations. As indicated, however, reservoir temperature (temperature of the subterranean formation) may be adequate to activate the thermochemical reaction without a chemical activator (e.g., the acid).

In implementations, the reaction is activated by the temperature of the subterranean formation and not by an acid. In those implementations, the treatment fluid does generally not include activator acid, nor is such activator acid typically otherwise provided to the water zone during the treatment.

In implementations, acid (activator acid) is provided to the water zone, wherein the reaction is activated by the acid and not by the temperature of the subterranean formation, and wherein the treatment fluid as provided through the wellbore does not include the acid. Instead, the acid may be provided through the wellbore to the water zone after providing the treatment to the water zone.

In implementations, the reaction may be activated by both subterranean formation temperature and the acid. For instance, the temperature of the formation may trigger and promote the reaction, and the acid may further activate (promote) the reaction.

In implementations, the nitrogen-generating compound is the nitrite-containing compound and the reaction involves dissociation of the nitrite-containing compound into the nitrogen gas. In some of these implementations, the generating (forming) of the nitrogen gas does not involve an ammonium-containing compound. In other words, the nitrogen-generating compound does not additionally include the ammonium-containing compound.

In implementations, the nitrogen-generating compound includes the nitrite-containing compound and additionally includes as a second nitrogen-generating compound the ammonium-containing compound. In these implementations, the reaction includes a reaction (e.g., thermochemical reaction) of the nitrite-containing compound with the ammonium-containing compound to generate the nitrogen gas. In a specific implementation, the ammonium-containing compound includes ammonium chloride, and the nitrite-containing compound includes sodium nitrite or potassium nitrite, or both. In some of these implementations, the method may include injecting the acid through the wellbore into the water zone after injecting the treatment fluid through the wellbore into the water zone, wherein the reacting of the nitrite-compound with the ammonium-containing compound is activated by at least the acid.

The method may include forming nitrogen gas via activation of the reaction of the nitrogen-generating compound in the water zone, thereby foaming (see block 206) the treatment fluid in the water zone to give foamed treatment fluid having the polymer, wherein the activation is by heat (from the subterranean formation) or by acid, or both.

At block 206, the method includes generating foam (in-situ) from the nitrogen gas and the treatment fluid in the water zone to give foamed polymer in the water zone. The generating of the foam in the water zone may be via the nitrogen gas giving the polymer as foamed polymer in the water zone. The treatment fluid as foamed includes the foamed polymer. The method can include generating foam in-situ from the nitrogen gas and the treatment fluid in the water zone to give foamed treatment fluid in the water zone, wherein the foamed treatment fluid includes foamed polymer. In implementations, foam is not generated from the nitrogen gas and the treatment fluid in an oil zone of the subterranean formation because oil in the oil zone acts as a defoamer. An oil zone may be a zone of the subterranean formation having crude oil and in which during production, crude oil flows from the oil zone into the wellbore.

At block 208, the method includes sealing the water zone with the foamed polymer (sealing the water zone with the treatment fluid as foamed), resulting in the foamed polymer restricting water flow from the water zone into the wellbore.

The sealing of the water zone may involve allowing the foamed polymer to harden to give solid (e.g., hardened) foam polymer in the water zone that blocks (restricts or substantially fully blocks) water flow from the water zone into the wellbore, thereby providing for water shutoff of the water zone.

In the foamed treatment fluid in the water zone, the polymer of the foamed polymer may undergo crosslinking via the crosslinker. Thus, the foamed polymer may become a solid foam polymer that restricts water flow from the subterranean formation into the wellbore at the water zone. The method may include crosslinking the polymer with the crosslinker (e.g., into a polymer gel), wherein the foamed polymer hardens into a solid foamed polymer. Thus, the method may include crosslinking the polymer via the crosslinker to give crosslinked polymer, wherein the foamed treatment fluid includes the crosslinked polymer, and wherein the crosslinked polymer as foamed restricts water flow from the water zone into the wellbore. Further, the method may include bonding the foamed polymer to rock in the water zone via an adsorption system (e.g., having a silane), wherein the treatment fluid as provided into the wellbore includes the adsorption system.

At block 210, the method may include producing hydrocarbon (e.g., natural gas and/or crude oil) from the subterranean formation through the wellbore to the Earth surface. The motive force for flow of the hydrocarbon may be pressure of the subterranean formation. To initiate production, a production valve at the wellhead may be opened. In implementations, the produced hydrocarbon may discharge from the wellbore 102 through the production valve into a sales line (conduit). The produced hydrocarbon may be discharged for distribution or downstream processing. This production may generally occur after completion of blocks 202-208 to seal (shutoff) the water zone. Beneficially, the hydrocarbon produced may have less water than the hydrocarbon produced via the wellbore from the subterranean formation before shutoff of the water zone.

For embodiments with the reaction (e.g., thermochemical reaction) of the nitrite-containing compound (e.g., a thermochemical reagent) with the ammonium-containing compound (e.g., a thermochemical reagent) to generate (block 204) the nitrogen gas, a post-flush having acid to activate the reaction may be implemented (performed, applied). In embodiments, the post-flush having acid may be implemented in response to (or in view of) the pH of the treatment fluid being greater than 11. In implementations, the pH being greater than 11 (e.g., in the range of 11 to 13) may preclude activation of the reaction by formation temperature. The method at block 204 may include performing a post-flush having an acid for activating the reaction, thereby activating the reaction with the acid, wherein pH of the treatment fluid may be greater than 11. In implementations, a post-flush having acid (for reaction activation) is not performed, and wherein pH of the treatment fluid may be less than 11. In implementations, activation (triggering) of the reaction by formation temperature may occur for the reaction to proceed and generate (block 204) nitrogen gas. In implementations, pH of the treatment fluid is less than 11, temperature of the subterranean formation activates the reaction, and a post-flush having acid is not performed.

As discussed, the nitrogen-generating compound may be an ammonium-containing compound and/or a nitrite-containing compound. In implementations, the ammonium-containing compound can more generally be compounds that can provide or generate ammonium ions. A compound (analogous to the ammonium-containing compound) that can participate in the thermochemical reaction (in lieu of or in addition to the ammonium-containing compound) to generate the nitrogen gas is urea. Urea, also known as carbamide, is an organic compound with the chemical formula $CO(NH_2)_2$. In implementations, the nitrite-containing compound can more generally be compounds that can provide or generate nitrite ions. A compound (analogous to the nitrite-containing compound) that can participate in the thermochemical reaction (in lieu of or in addition to the nitrite-containing compound) to generate the nitrogen gas is sodium hypochlorite. Pairs of nitrogen-generating compounds that may be included in the treatment fluid as thermochemical reagents to participate in the in-situ thermochemical reaction (e.g., activated by formation temperature and/or presence of an activator acid) to generate nitrogen include: (1) urea-sodium hypochlorite, (2) urea-sodium nitrite, (3) ammonium hydroxide-sodium hypochlorite, (4) ammonium chloride-sodium nitrite, and so on. The above-depicted example equation for the thermochemical reaction has the first thermochemical reagent-second thermochemical reagent pair as ammonium chloride ($NH_4Cl$)-sodium nitrite ($NaNO_2$).

The polymer that may be employed (in the treatment fluid) as the foamed polymer for water shutoff can include conventional polymer systems (compositions) for water shutoff. However, the conventional systems do not give in-situ foaming of the polymer to give the foamed polymer that crosslinks or otherwise cures into a solid foamed polymer that plugs the water zone.

The polymer can be polymers that are capable of forming a crosslinked polymer matrix as a polymer gel. In embodiments, the polymer can solidify to form a gel or solid polymer, thereby creating a solid barrier that prevents fluid flow and therefore shuts off the water breakthrough. In embodiments, the treatment fluid can include the crosslinker (e.g., polyethyleneimine). Again, in implementations, the polymer may capable of crosslinking to form a crosslinked polymer matrix within the zone of interest (see water zone 107 of FIG. 1). The polymer may include polyacrylamides or polyimide acrylates, or both. The polymer as added to the treatment fluid (e.g., treatment fluid 108) may have an average molecular weight, for example, of 250,000 to 500,000 grams per mole.

In implementations, the polymer is a polyacrylamide homopolymer or a copolymer of acrylamide monomer units and acrylate monomer units, or a copolymer of acrylamide monomer units and acrylic acid monomer units, or a combination of these. The polymer may be PAM-co-AA. In implementations, the polymer is a copolymer of acrylamide monomer units and butyl-acrylate monomer units. For example, the polymer may be poly[acrylamide-co-(tert-butyl acrylate)] (PAtBA).

The crosslinker may be a crosslinker that is capable of crosslinking the polymer to form a crosslinked polymer matrix within the zone of interest. In implementations, the crosslinker is an organic crosslinker. In implementations, the crosslinker includes an imine functional group. In implementations, the crosslinker is polyethyleneimine. The polyethyleneimine can be a linear polyethyleneimine or a branched polyethyleneimine. The crosslinker may generally have an average molecular weight sufficient to crosslink the polymer to produce a crosslinked polymer (e.g., polymer gel) within the water zone.

For examples of applicable polymer and crosslinkers, see U.S. Pat. No. 11,111,753, which is incorporated by reference herein in its entirety. The polymers and adsorption system disclosed in U.S. Pat. No. 11,111,753 (hereinafter '753) are applicable examples for inclusion in the present treatment fluid (treatment fluid 108) to give in-situ foamed polymer (not disclosed by '753) via the present inclusion (not disclosed by '753) of nitrogen-generating compounds in the treatment fluid. Again, '753 discloses examples of adsorption systems that may be employed in the present treatment fluid. Other adsorption systems not disclosed in '753 are also applicable.

In some implementations, the treatment fluid (e.g., 108 of FIG. 1) includes an adsorption system along with the polymer, crosslinker, nitrogen-generating compound(s), etc. The adsorption system may increase the adhesion of the crosslinked polymer to a rock surface of the pores of the subterranean formation at the water zone (or gas zone if being isolated). The adsorption system may include a silane compound or a silane compound and a silicate component. Thus, the adsorption system has a silane. The adsorption system may have silicate, such as sodium silicate or potassium silicate, or both. The composition of the adsorption system may be modified based on the type of rock in the subterranean formation. For example, subterranean formations comprising a greater concentration of silicates, such as sandstone formations, may allow the treatment fluid to have an adsorption system having silane compounds but no silicates. In other formations, such as carbonate formations for example, the subterranean formation may have a lesser concentration of silicates, in which case the adsorption system of the treatment fluid may include both the silane compounds and the silicate components.

The silane compound may be an amino-silane compound, which may have at least one amine functional group. For example, in some embodiments, the silane compound may have the chemical formula $H_2N-R^1-Si(R^2)_3$, where $R^1$ is a linear or branched hydrocarbyl having from 1 to 20 carbon atoms, at least one $R^2$ is an alkoxy group having general formula $X-O-R^3$, wherein $R^3$ can be a linear or branched hydrocarbyl having 1 to 10 carbon atoms, and each of the other $R^2$ groups can be independently selected from a linear or branched hydrocarbyl having 1 to 10 carbon atoms, an amine group, or the aforementioned alkoxy group.

The treatment fluid (as injected into the wellbore and having the polymer and crosslinker to give the polymer gel or solid polymer) may have a pH of in the range of 9 to 14, and prior to injection into the water zone, may have a viscosity in a range of 5 centipoise (cP) to 10 cP prior to injection. The treatment fluid having the polymer and crosslinker may also include an additives, such as salts, fillers, organic compounds, preservatives, and rheology modifiers. Salts may be added to the treatment fluid to reduce or prevent clay swelling in the subterranean formation. Examples of salts include carboxylates. The salts included in the treatment fluid can include sodium, calcium, cesium, zinc, aluminum, magnesium, potassium, strontium, silicon, lithium, ammonium, chlorides, bromides, carbonates, iodides, chlorates, bromates, formats, nitrates, sulfates, phosphates, oxides, fluorides, or any combination of these. In implementations, the treatment fluid can include filler particles, such as silica particles (that can be larger than the silica nanoparticles that may be added for foam stability).

The transition of the polymer from a flowable liquid to a crosslinked gel may include formation of covalent bonds between individual polymers via crosslinking reactions, which may build viscosity in the treatment fluid. The concentration of crosslinker in the treatment fluid can depend on the temperature of the subterranean formation at the water zone. In implementations, the concentration of crosslinker in the treatment is in a range of 0.3 wt % to 2 wt %. An example of the treatment fluid 108 having the polymer and crosslinker in water at the surface 104 may include the polymer in a range of 3 wt % to 10 wt %, crosslinker (e.g., polyethyleneimine) in a range of 0.3 wt % to 2.0 wt %, and the silane (e.g., amino-silane) in a range of 3 wt % (or 5 wt %) to 10 wt %. This example of the treatment fluid 108 may include silicate, such as sodium silicate or potassium silicate, or both. The polymer may have an average molecular weight of from 250,000 to 500,000 grams per mole. The treatment fluid may have an initial viscosity in a range of 5 cP to 10 cP at surface prior to injection into the wellbore 102 (and into the water zone 107) and before crosslinking of the polymer.

Example

A treatment fluid (for water shutoff) having sodium nitrite as a nitrogen-generating compound was prepared in the laboratory. The activating or triggering of the sodium nitrite (or triggering/activation of the reaction of the sodium nitrite) to generate nitrogen gas may be by temperature (heat) and/or acid (e.g., acetic acid, citric acid, or hydrochloric acid). The treatment fluid as prepared in the laboratory in this Example included water, the polymer PAM-co-AA, crosslinker, formaldehyde, sodium silicate, foaming agent, foam stabilizer, surfactant, 3-aminopropyltriethoxysilane, and the nitrogen-generating compound (sodium nitrite).

Two solutions were initially prepared: (1) polymer solution and (2) adsorption system. To give the treatment fluid, solution (1) was slowly added to solution (2).

The (1) polymer solution was prepared by starting with 82 grams (g) of a solution of 4 w/v % of PAM-co-AA in water. Then, 1.1 g of a 37 wt % formaldehyde solution in water was added to and mixed thoroughly with the 82 g of the PAM-co-AA solution. This mixture was left untouched for 30 minutes. Subsequently, sodium nitrite was added, and then a foaming agent, crosslinker, surfactant, and foam stabilizer were added to give the polymer solution.

The (2) adsorption system solution was prepared by starting with 28.6 g of liquid sodium silicate. Then, 368 milliliters (mL) (386 g) of distilled water was added to and mixed with the sodium silicate giving an initial mixture at 396.6 g. Then, 20.5 mL of 3-aminopropyltriethoxysilane was added to and mixed thoroughly with the mixture to give the adsorption system solution.

The (1) polymer solution was slowly added to the (2) adsorption system solution to give the treatment fluid. In practice in the field, the combining of the polymer solution and the adsorption system can occur when ready to pump the treatment fluid into the wellbore. In implementations, the polymer solution and the adsorption system are not combined before one hour of pumping the treatment fluid into the wellbore.

Figure 3:
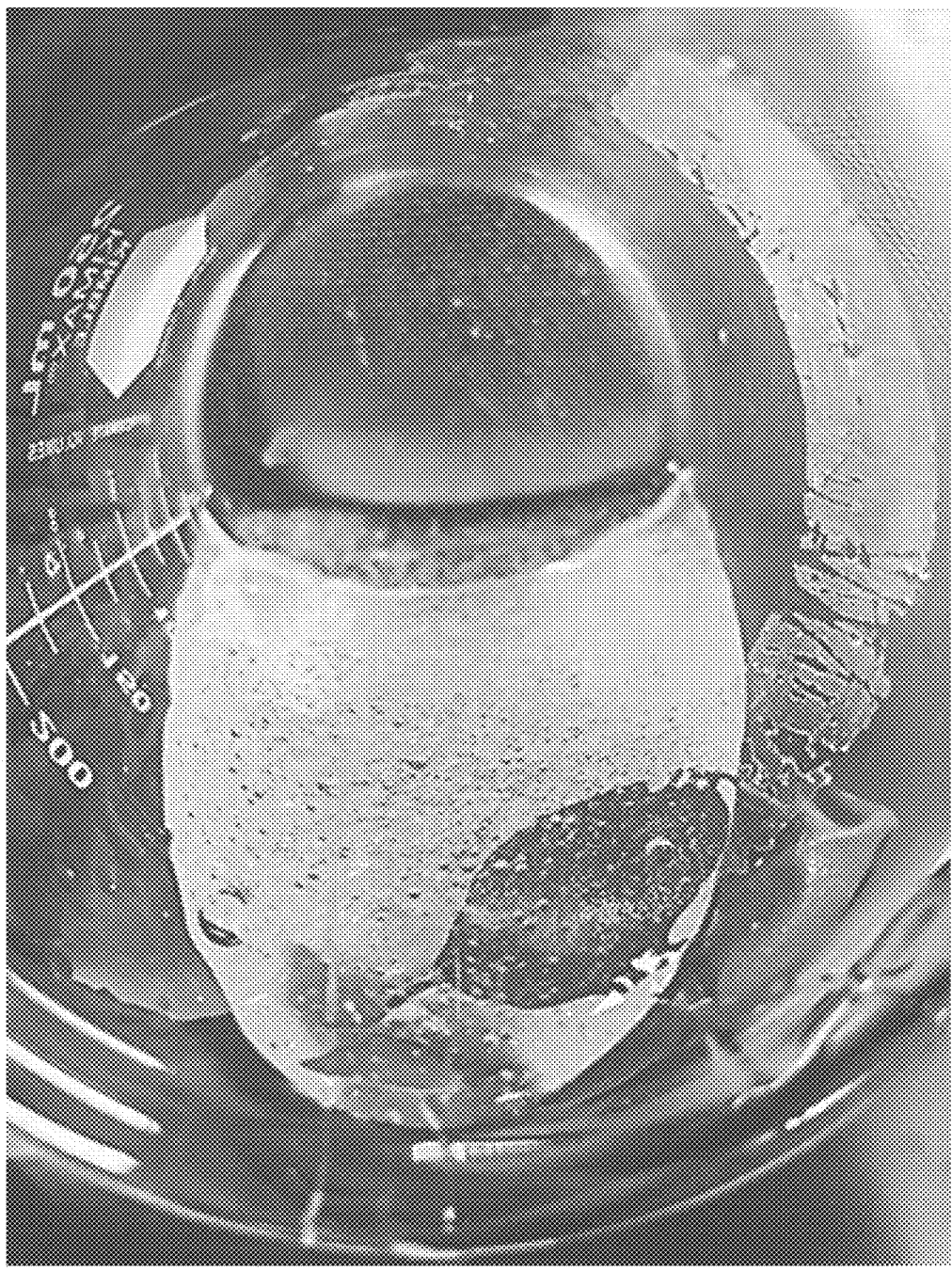
FIG. 3 is an image of a sample of pre-activated treatment fluid prepared in the Example.

FIG. 3 depicts a sample of the treatment fluid (pre-activated) prepared in the Example. The treatment fluid can be labeled as an in-situ foam generating polymer system or an in-situ foaming water-shutoff fluid. The depicted sample is a pre-activated sample (the sodium nitrite not yet activated to generate nitrogen gas) and may be as prepared and mixed at surface in the field. As indicated by the depicted image of the sample, foam is not yet created. Thus, it may generally be practical to pump the fluid from surface and squeeze into the formation, and in which hydrostatic pressure may be relatively high. The sample looks similar to conventional polymer fluid.

Again, the treatment fluid is depicted as before activation of the reaction of the sodium nitrite to generate nitrogen gas. As mentioned, this sample may be analogous to the treatment fluid in the field as prepared at surface prior to introduction into the wellbore. Again, as can be seen from the image (photo), foam is not yet generated. Thus, commercial implementations may pump the treatment fluid from surface for squeeze into the formation, and in which the hydrostatic pressure of the treatment fluid in the wellbore may be greater than the hydrostatic pressure of the treatment fluid if foamed at the surface (such as with the addition of nitrogen gas at surface). Lastly, this depicted example of the present treatment fluid is visually similar in appearance to conventional polymer fluid (without a nitrogen-generating component).

Figure 4:
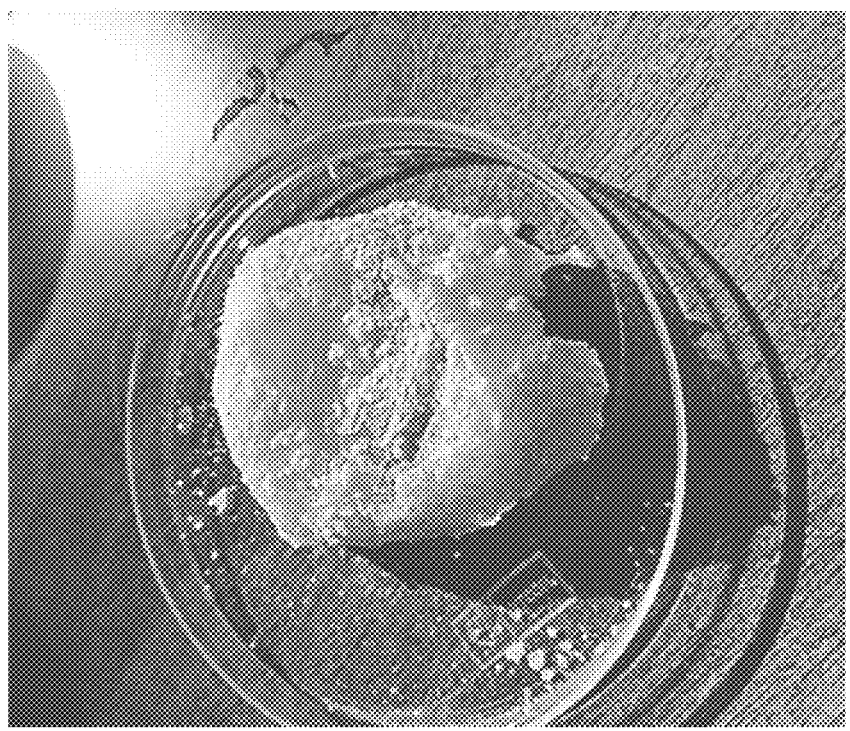
FIG. 4 is an image of a sample of activated treatment fluid with prepared in the Example.

FIG. 4 depicts an activated sample of the treatment fluid giving foamed polymer as the sample (as shown). In particular, depicted is a sample of the treatment fluid prepared in the Example and in which the reaction of the sodium nitrite in the sample has been activated, thereby generating nitrogen gas within the sample. The activation of the treatment fluid (or activation of the reaction of the sodium nitrite in the treatment fluid) was by increasing the temperature of the treatment fluid to 100° F. The generated nitrogen gas foamed the sample of the treatment fluid giving the sample as foamed polymer. The depicted sample may be characterized as in-situ foamed water-control fluid analogous to when the treatment fluid is implemented in a subterranean formation.

In the field, as the treatment fluid reaches the water zone, the reaction of the nitrogen-generating compound (e.g., sodium nitrite, etc.) may be activated by downhole temperature and thus foamed fluid generated in-situ to seal the water-bearing zone(s). This may (a) eliminate the need for a gas source on the surface and (b) avoid mixing challenges to prepare foam at the surface.

Figure 5:
FIG. 5 is an image of a sample of a dried activated treatment fluid prepared in the Example.

FIG. 5 shows a sample of the treatment fluid prepared in the Example after activation and drying to give the sample as dried foamed treatment fluid (dried foamed polymer) that is a solid and stable. For analogy in the field, the sample may be labeled as dried in-situ foamed polymer having stability.

The employment of a single (only one) nitrogen-generating compound (a single type) in the treatment fluid may be sufficient to generate an adequate amount of nitrogen gas to give the foamed polymer for water shutoff. In this Example, only sodium nitrite was utilized (as the nitrogen-generating compound) to generate nitrogen gas. This Example did not include an ammonium-containing compound (e.g., ammonium chloride, etc.) as a nitrogen-generating compound in the treatment fluid to give the foamed polymer (for water shutoff). However, the thermochemical reaction of sodium nitrite with ammonium chloride in a fluid has been confirmed to generate nitrogen gas. These nitrogen-generating compounds generate nitrogen gas when activated, such as by heat or acids. See the above depicted thermochemical reaction equation of ammonium chloride and sodium nitrite.

A number of implementations have been described. Nevertheless, it will be understood that various modifications may be made without departing from the spirit and scope of the disclosure.

What is claimed is:
1. A method of water shutoff, comprising:
providing a treatment fluid comprising a polymer, crosslinker, and a nitrogen-generating compound comprising a nitrite-containing compound through a wellbore into a water zone in a subterranean formation;

providing an acid to the water zone;
generating nitrogen gas in the water zone by a reaction of the nitrogen-generating compound, wherein the reaction is activated by the acid;
generating foam from the nitrogen gas and the treatment fluid in the water zone to give foamed polymer in the water zone; and
sealing the water zone with the foamed polymer, wherein sealing the water zone comprises allowing the foamed polymer to harden to give solid foam polymer in the water zone that blocks water flow from the water zone into the wellbore, thereby providing for water shutoff of the water zone.

2. The method of claim 1, wherein the treatment fluid as provided through the wellbore does not comprise the acid.

3. The method of claim 1, comprising injecting the acid through the wellbore into the water zone after injecting the treatment fluid through the wellbore into the water zone, wherein the reaction of the nitrogen-generating compound is activated by at least the acid.

4. The method of claim 1, wherein the treatment fluid as foamed comprises the foamed polymer, and wherein foam is not generated from the nitrogen gas and the treatment fluid in an oil zone of the subterranean formation because oil in the oil zone acts as a defoamer.

5. The method of claim 4, wherein the reaction comprises dissociation of the nitrite-containing compound into the nitrogen gas, wherein generating the nitrogen gas does not involve an ammonium-containing compound, and wherein the nitrite-containing compound comprises sodium nitrite or potassium nitrite, or both.

6. The method of claim 4, wherein the nitrogen-generating compound comprises a second nitrogen-generating compound comprising an ammonium-containing compound, and wherein the reaction comprises a reaction of the nitrite-containing compound with the ammonium-containing compound to generate the nitrogen gas.

7. The method of claim 6, comprising bonding the foamed polymer to rock in the water zone via an adsorption system comprising a silane, wherein the treatment fluid comprises the adsorption system.

8. The method of claim 6, wherein the ammonium-containing compound comprises ammonium hydroxide, ammonium chloride, ammonium bromide, ammonium nitrate, ammonium nitrite, ammonium sulfate, ammonium carbonate, or ammonium hydroxide, or any combinations thereof, and wherein the nitrite-containing compound comprises sodium nitrite or potassium nitrite, or both.

9. The method of claim 1, wherein sealing the water zone with the foamed polymer comprises sealing the water zone with the treatment fluid as foamed, wherein nitrogen gas is not added to the treatment fluid prior to introduction of the treatment fluid into the wellbore, wherein foam is not added to the treatment fluid prior to the introduction of the treatment fluid into the wellbore, and wherein foam is not generated in the treatment fluid prior to the introduction of the treatment fluid into the wellbore.

10. A method of water shutoff, comprising:
injecting a treatment fluid comprising a polymer, crosslinker, and a nitrogen-generating compound comprising a nitrite-containing compound through a wellbore into a water zone in a subterranean formation;
providing an acid to the water zone;
reacting the nitrite-containing compound in the water zone to give nitrogen gas in the water zone, the reaction being activated by the acid;
generating foam in the water zone via the nitrogen gas giving the polymer as foamed polymer in the water zone; and
sealing the water zone with the foamed polymer, wherein sealing the water zone comprises the foamed polymer restricting water flow from the water zone into the wellbore.

11. The method of claim 10, comprising crosslinking the polymer with the crosslinker, wherein the foamed polymer hardens into a solid foamed polymer, wherein the polymer comprises polyacrylamide, and wherein foam is not generated from the nitrogen gas and the treatment fluid in an oil zone of the subterranean formation because oil in the oil zone acts as a defoamer.

12. The method of claim 11, wherein the polyacrylamide comprises at least one of polyacrylamide homopolymer (PAM), a copolymer of acrylamide and an acrylate, or PAM-co-AA that is a copolymer of acrylamide and acrylic acid.

13. The method of claim 10, wherein the nitrite-containing compound comprises sodium nitrite or potassium nitrite, or both, and wherein the nitrite-containing compound is not encapsulated.

14. The method of claim 10, wherein the treatment fluid further comprises an ammonium-containing compound, and wherein reacting the nitrite-containing compound in the water zone to give nitrogen gas comprises reacting the nitrite-containing compound with the ammonium-containing compound in the water zone to give the nitrogen gas in the water zone.

15. The method of claim 14, wherein the reacting of the nitrite-compound with the ammonium-containing compound is activated by the acid, wherein nitrogen gas is not added to the treatment fluid prior to introduction of the treatment fluid into the wellbore, wherein foam is not added to the treatment fluid prior to introduction of the treatment fluid into the wellbore, and wherein foam is not generated in the treatment fluid prior to introduction of the treatment fluid into the wellbore.

16. The method of claim 15, comprising injecting the acid through the wellbore into the water zone after injecting the treatment fluid through the wellbore into the water zone, wherein the reacting of the nitrite-compound with the ammonium-containing compound is activated by at least the acid.

17. The method of claim 10, comprising bonding the foamed polymer to rock in the water zone via an adsorption system comprising a silane, wherein the treatment fluid comprises the adsorption system, and wherein the polymer comprises polyacrylamide homopolymer or polyacrylamide copolymer.

* * * * *